United States Patent
Kim et al.

(10) Patent No.: US 7,664,923 B2
(45) Date of Patent: Feb. 16, 2010

(54) METHOD AND SYSTEM FOR UPDATING SOFTWARE

(75) Inventors: Hyung-Hoon Kim, Suwon-si (KR); Chin-Kyu Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 474 days.

(21) Appl. No.: 10/819,555

(22) Filed: Apr. 7, 2004

(65) Prior Publication Data

US 2005/0060699 A1 Mar. 17, 2005

(30) Foreign Application Priority Data

Sep. 17, 2003 (KR) .................. 10-2003-0064549

(51) Int. Cl.
*G06F 12/00* (2006.01)
(52) U.S. Cl. .................. 711/162; 707/204; 711/103; 714/6
(58) Field of Classification Search .......... 711/162
See application file for complete search history.

(56) References Cited

U.S. PATENT DOCUMENTS

| 6,263,399 B1 * | 7/2001 | Hwang ....................... 711/103 |
| 6,526,447 B1 * | 2/2003 | Giammaria ................. 709/232 |
| 6,604,237 B1 * | 8/2003 | Giammaria ................. 717/174 |

* cited by examiner

*Primary Examiner*—Christian P Chace
*Assistant Examiner*—Matthew Bradley
(74) *Attorney, Agent, or Firm*—The Farrell Law Firm, LLP (57) ABSTRACT

A method and a system for updating software stored in a flash memory, which enables a user to resume a suspended updating process even when log data stored in a journaling area is lost. According to the present invention, log data indicating the results of implementation of each step of the updating process is stored in a journaling area allocated in a flash memory to update the software. The data stored in the journaling area is copied into a first backup journaling area allocated in the flash memory whenever each step is completed. Concurrently, log data indicating the copying results is stored in a second backup journaling area.

4 Claims, 7 Drawing Sheets

METHOD AND SYSTEM FOR UPDATING SOFTWARE

PRIORITY

This application claims priority to an application entitled "Method and System for Updating Software" filed in the Korean Intellectual Property Office on Sep. 17, 2003 and assigned Serial No. 2003-64549, the contents of which are hereby incorporated by reference.

BACKGROUND OF THE INVENTION

1. Field of the Invention

The present invention relates generally to a method and a system for updating software, and more particularly to a method and a system for updating software stored in a flash memory.

2. Description of the Related Art

With the rapid development of portable devices, such as mobile communication terminals and PDAs (Personal Digital Assistants), digital convergence has driven a new trend to combine a variety of functions and shorten the model replacement cycle. Accordingly, it becomes more likely that new portable devices are supplied on the market with undesired functional defects that have not been detected during the development stage. Also, after completion of the development of a portable device, an additional function may need to be released in a patch form.

In such cases, the software of already-sold portable devices must be updated to correct or upgrade the software defects. Qualified service engineers from the device supplier or after-sales service centers may directly visit all the users of the defective portable devices. Alternatively, the users can visit the after-sales service centers to update the software of their portable devices.

To eliminate such trouble, an OTA-SD (Over The Air-Software Download) has been suggested for portable devices capable of mobile communications. The OTA-SD is a download scheme that accesses a predetermined server through the Internet, and selects an update file to be downloaded and downloads the update file onto a portable device. It is also possible to primarily download an update file onto a PC through the Internet and then transfer the same update file from the PC to a portable device using an USB (Universal Serial Bus) cable.

After downloading an update file, usually, the user reboots the portable device being updated. The updating process is implemented by erasing a area storing a software code to be updated in a non-volatile memory where software is generally stored, and storing a downloaded update software code in the area to be updated. Commonly, a flash memory is used as a non-volatile memory that stores software in a portable device. The flash memory stores software, such as boot codes, application programs, font binaries, and content binaries.

However, the process of updating a portable device by downloading update software may be interrupted by an abnormal cause, for example, when the portable device is suddenly turned off by the separation of a battery. To prepare for the sudden interruption of the updating process, journaling can be implemented. When journaling is utilized, a backup area and a journaling area are allocated in a flash memory so that data stored in a area to be updated can be copied into the backup area and log data indicating the results of implementation of each step of the updating process can be stored in the journaling area. The updating process comprises the steps of copying the data stored in a area to be updated into the backup area, erasing the area to be updated, and storing an update software code in the area to be updated. By having a backup copy of the data stored in the area to be updated before erasing it, it is possible to minimize the chance of losing the data without being updated, when an unexpected power loss occurs after erasure of the area to be updated. Also, upon completion of each of the copying, erasing, and storing steps, log data indicating the results of implementation of each step is stored in the journaling area. Accordingly, when rebooting a device after a temporary power loss during the updating process, the user can refer to the stored log data to resume the updating process from a proper point.

Either an NOR-type flash memory or an NAND-type flash memory can be used as a flash memory storing software in a portable device. Unlike the NOR flash memory, the NAND flash memory often loses all the log data stored in the journaling area when implementing an updating process including a journaling step. The NOR flash memory continuously stores new log data generated during the updating process in an erased journaling area. In other words, after storing one log data in the journaling area, the NOR flash memory stores additional log data next to the previous log data in the journaling area, without erasing the previous log data. The operation of storing log data continues until the journaling area is filled with log data.

Unlike the NOR flash memory, the NAND flash memory has a limitation in the NOP (Number of Program). The NAND flash memory always executes the erase operation before attempting to store data. In the NAND flash memory, the erase operation is executed in 16-Kbyte blocks, while the program and read operations are executed in 512-byte pages. The NOP refers to the number of programming and storing operations, which can be executed without erasing data in a once-erased page. The NOP of the main memory area is defined differently according to NAND flash memory device suppliers.

If the programming and storing operations in the NAND flash memory exceeds the defined NOP, it cannot be guaranteed to correct bit errors due to the physical properties of the NAND flash memory. Because the NAND flash memory operates in pages while programming, a high voltage is supplied to a bit to be programmed and to the other bits within the same page. Accordingly, if the NAND flash memory is programmed to store additional data next to the previous data in the same page without erasure, the previous data will likely be overwritten to be replaced by the new additional data. Then, single bit errors will be repeatedly caused, which may lead to an incorrectable double or multiple bit errors in the NAND flash memory. Because of the double or multiple bit error, the NAND flash memory will have incorrect data. Therefore, if a program operation is executed to store data in an erased NAND flash memory area, the NAND flash memory, unlike the NOR flash memory, cannot keep storing log data without erasure until the journaling area is filled.

If journaling is applied to update software of a portable device because of the physical properties of the NAND flash memory, it will be necessary to first erase the journaling area and then execute a program operation whenever storing log data. However, when an unexpected power loss occurs after erasure of the journaling area, there may be a possibility of losing all the log data previously stored in the journaling area. Accordingly, log data stored in the Journaling area is moved into a RAM (Random Access Memory) before erasing the journaling area. However, if a power loss occurs after erasing the journaling area and before storing new log data from the RAM in addition to the previous log data in the journaling area, all the log data will likely be lost. Therefore, the journaling step for preventing data loss that may be caused by an unexpected power loss during an updating process will be useless in the NAND flash memory.

As stated above, the NAND-type flash memory is required to repeat the erase and program operations to store data.

Therefore, journaling may be useless when updating software in a portable device that stores software in the NAND flash memory.

SUMMARY OF THE INVENTION

Accordingly, the present invention has been designed to solve the above—and other problems occurring in the prior art, and an object of the present invention is to provide a method and a system for updating software stored in a flash memory, which enables a user to resume a suspended updating process even when log data stored in a journaling area is lost.

In order to accomplish the above and other objects of the present invention, log data indicating the results of implementation of each step of the updating process is stored in a journaling area allocated in a flash memory to update software. The data stored in the journaling area is copied into a first backup journaling area allocated in the flash memory whenever each step is completed. At the same time, log data indicating the copying results is stored in a second backup journaling area.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may make the subject matter of the present invention rather unclear.

Figure 1:
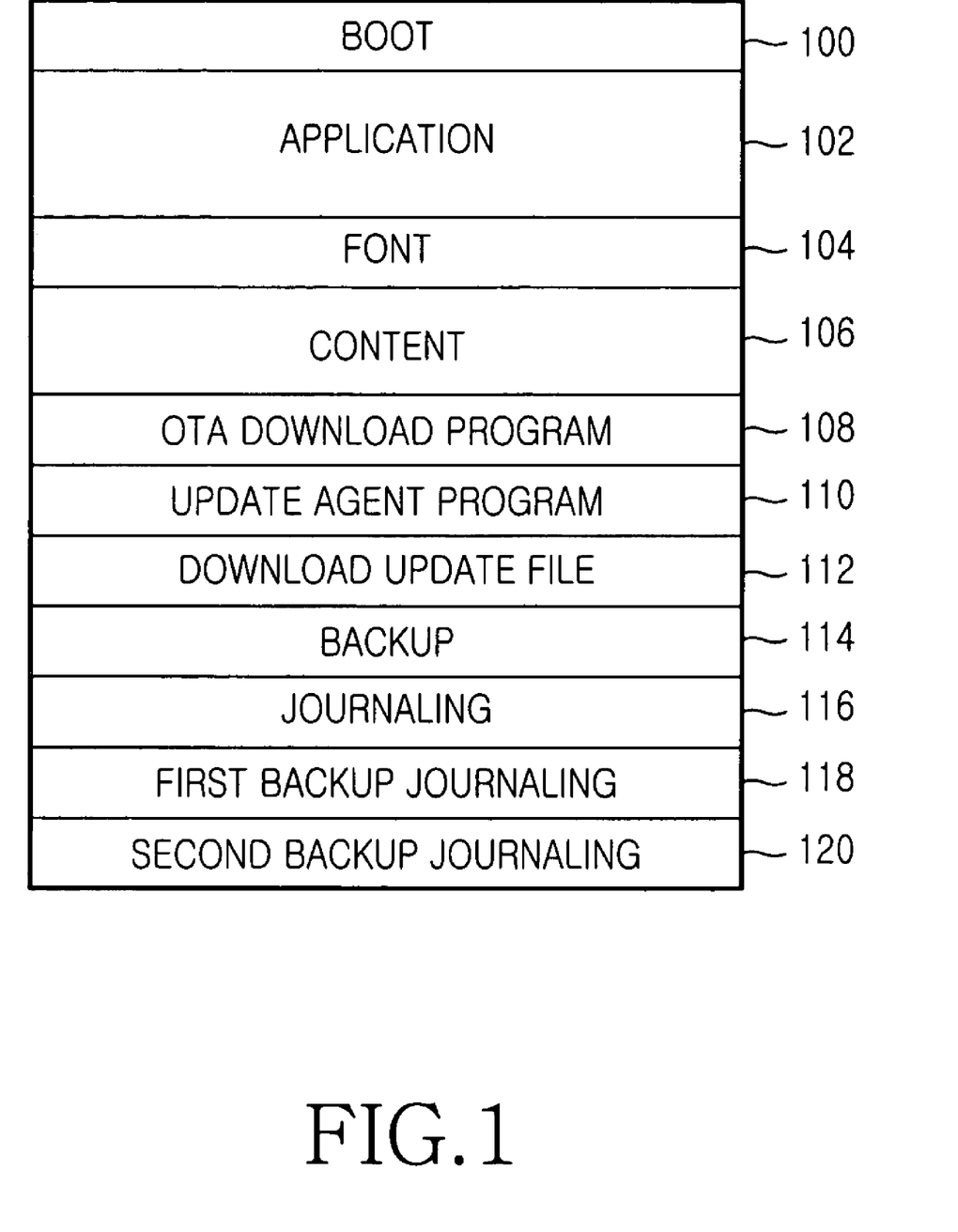
FIG. 1 illustrates a memory map of a flash memory according to the present invention.

FIG. 1 illustrates a memory map of a flash memory according to the present invention. The flash memory stores a boot code, an application program, a font binary, and a content binary for the operation and various functions of a portable device. The flash memory having the illustrated memory map can be updated by an update file download using the OTA-SD. The flash memory includes first and second backup journaling areas 118 and 120 allocated according to the present invention. The boot code, application program, font binary, and content binary are stored respectively in a boot area 100, an application area 102, a font area 104, and a content area 106 as illustrated in FIG. 1. Although the application area 102, font area 104, and content area 106 are generally subject to update, the boot area 100 can also be updated.

An OTA download program area 108, an update agent program area 110, a download update file area 112, a backup area 114, and a journaling area 116 are areas required to perform an updating process including journaling. The OTA download program area 108 stores an OTA download program for executing an update file download according to the OTA-SD. The download update file area 112 stores a downloaded update file. The update agent program area 110 stores an update agent program for performing the updating process. Also, the backup area 114 and the journaling area 116 are used for journaling performed during the updating process.

The first backup journaling area 118 is used for a backup of log data stored in the journaling area 116, whereas the second backup journaling area 120 is used to store log data indicating the erase and program state of the first backup journaling area 118.

Figure 2:
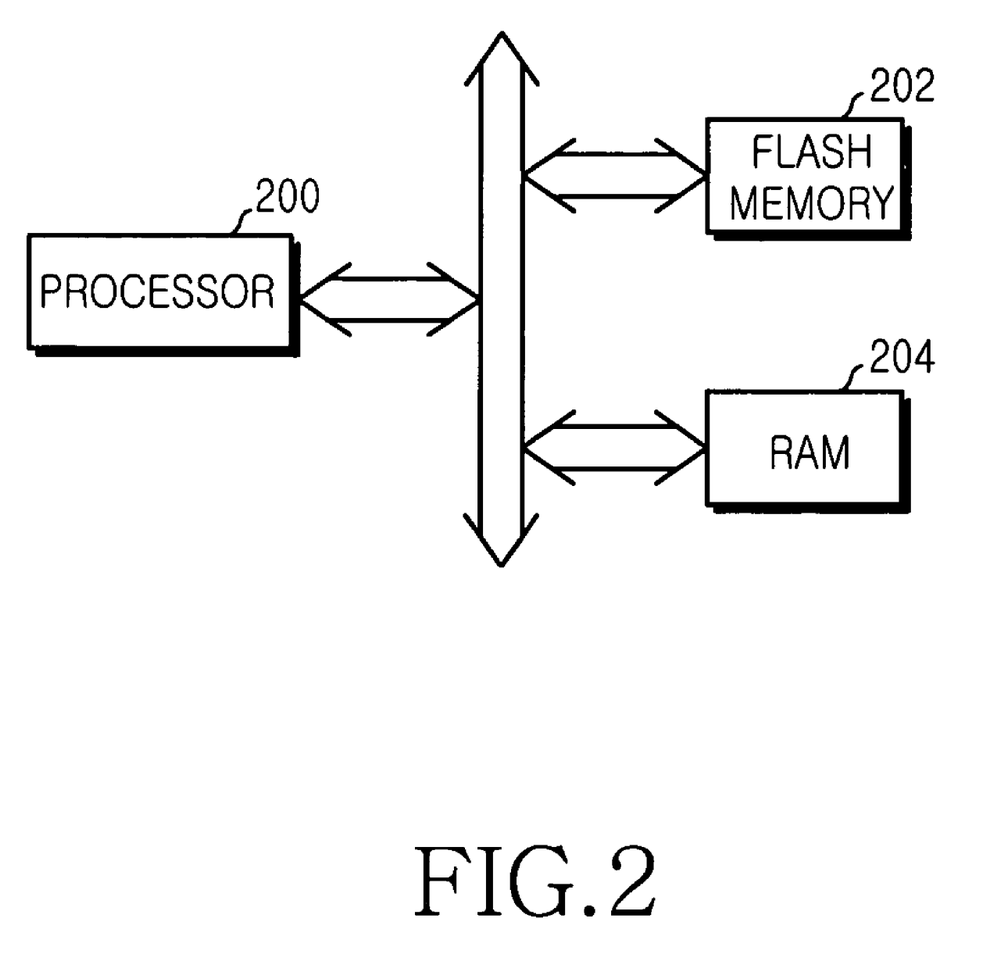
FIG. 2 illustrates a configuration of a software update system according to a first embodiment of the present invention.

FIG. 2 illustrates a configuration of a software update system according to a first embodiment of the present invention. A processor 200 is a main control means of a portable device adopting the software update system. The processor 200 controls the overall functions of the portable device according to the software stored in a flash memory 202. The flash memory 202 stores the software for operating the processor 200 and has a memory map as illustrated in FIG. 1. A RAM (Random Access Memory) 204 serves as a working memory according to the program implementation of the processor 200. Generally, a SDRAM (Synchronous Dynamic Random Access Memory) is preferred.

Figure 3:
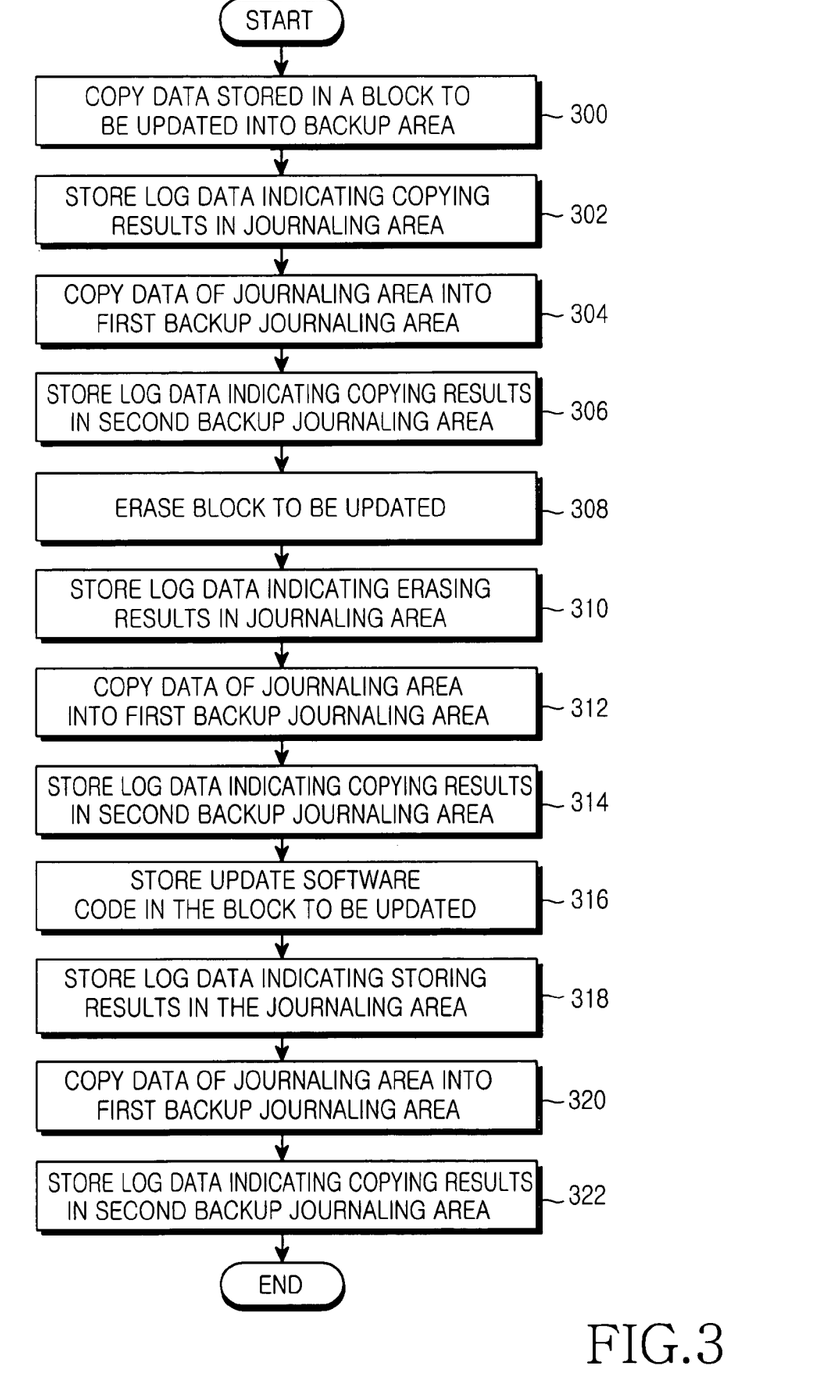
FIG. 3 is a flow chart illustrating an updating process according to the first embodiment of the present invention.

FIG. 3 is a flow chart illustrating an updating process comprising steps 300 to 322 according to the first embodiment of the present invention. The processor 200 performs the steps 300 to 322 when the flash memory 202 in FIG. 2 is a NAND-type flash memory having a memory map as illustrated in FIG. 1. The update agent program for performing the updating process is stored in the update agent program area 110 in FIG. 1.

Upon initiating the updating process according to the update agent program, the processor 200 copies the object area to be updated in the backup area 114 at step 300 to prepare for an abnormal power loss. The processor 200 erases the object area to be updated at step 308, and stores an update software code in the object area at step 316. Whenever each step of copy (step 300), erase (step 308), and store (step 316) is completed, log data indicating the results of implementation of each step is stored in the journaling area 116 at next steps 302, 310, and 318, respectively. It is necessary to erase the journaling area 116 in advance to store the log data. At steps 302, 310, and 318, the processor 200 copies previous log data stored in the journaling area 116 in the RAM 204 before erasing the journaling area 116, and then stores new log data in the journaling area 116.

However, there may be an unexpected sudden power loss when the log data generated at step 302 by copying the data stored in the object area to be updated into the backup area 114 is stored in the journaling area 116, when the log data generated at step 310 by erasing the object area is stored in the journaling area 116, or when the log data generated at step 318 by storing the update software code in the object area is stored in the journaling area 116. To prepare for such a sudden power loss, the data stored in the journaling area 116 is copied into the first backup journaling area 118 at steps 304-306, 312-314, and 320-322, respectively. Log data indicating the copying results is stored in the second backup journaling area 120. If there has been a previous software update and the current update is a second one, log data according to the previous update should have been stored in the journaling area 116. In such a case, steps 304 and 306 maintain the log data according to the previous update.

Figure 4:
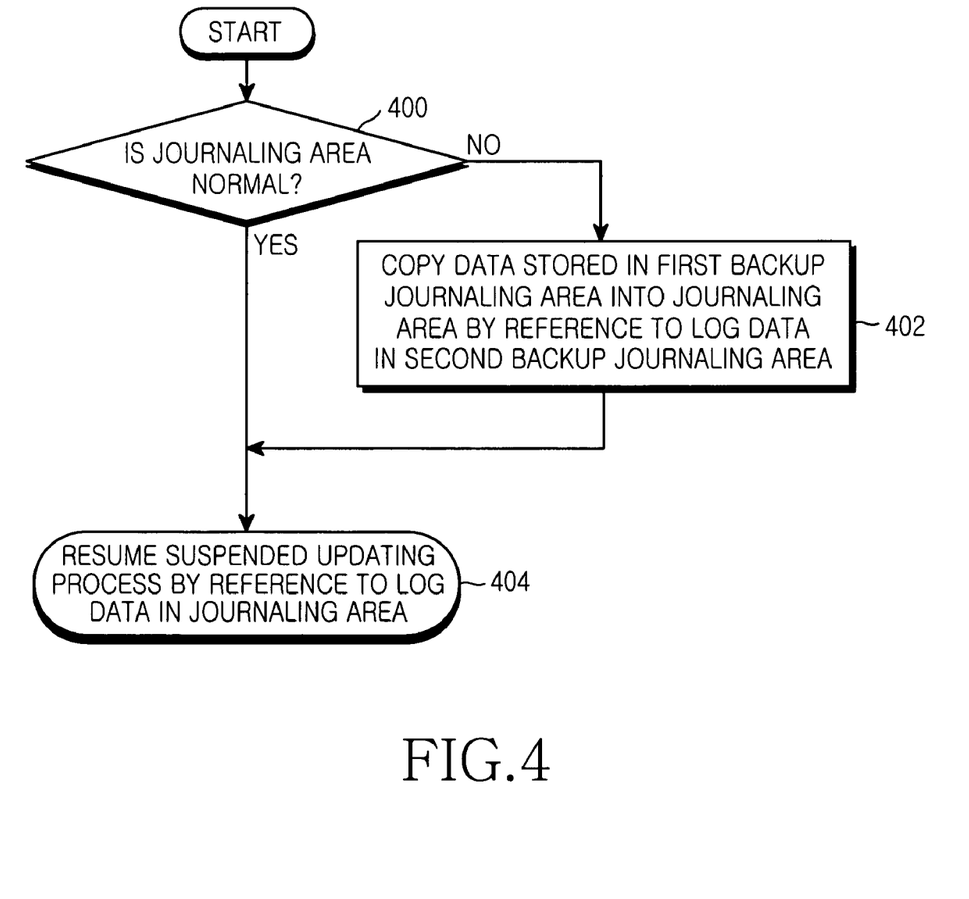
FIG. 4 is a flow chart illustrating a process of resuming a suspended updating process according to the first embodiment of the present invention.

FIG. 4 is a flow chart illustrating a process of resuming an updating process that has been suspended by a sudden power loss according to the first embodiment of the present invention. When the portable device reboots, the processor 200 performs steps 400 to 404 to resume the suspended updating process according to the update agent program stored in the update agent program area 110 in FIG. 1.

When booting, the processor 200 confirms whether an updating process has been suspended before. If so, the processor 200 confirms whether the journaling area 116 is normal according to the update agent program at step 400. If the journaling area 116 is normal (that is, if log data is normally stored in the journaling area 116), the processor 200 will proceed with step 404. At step 404, the processor 200 confirms to which step the updating process was completed, by reference to the log data stored in the journaling area 116, in order to resume the updating process from the next step. The processor 200 resumes the updating process from one of the steps illustrated in FIG. 3.

However, if the journaling area 116 is determined to be abnormal at step 400 (that is, if the journaling area 116 has been erased), the processor 200 will proceed with step 402 to copy the data stored in the first backup journaling area 118 into the journaling area 116 by reference to the log data of the second backup journaling area 120, and will then proceed with step 404. When the updating process is suspended by a sudden power loss with the journaling area 116 erased, the processor 200 can resume the updating process by reference to the log data copied into the first backup journaling area 118. Therefore, if journaling is applied in an NAND flash memory, a suspended updating process can be resumed even when the log data stored in the journaling area is lost.

The second backup journaling area 120 is also included in the NAND flash memory. Upon completion of copying the data stored in the journaling area 116 into the first backup journaling area 118, log data indicating the copying results is stored in the second backup journaling area 120 at steps 306, 314, and 322. When the second backup journaling area 120 is erased before storing the log data, there may be an abnormal power loss. In such an event, the updating process is suspended with the second backup journaling area 120 erased. However, because the log data has been normally stored in the journaling area 116, it is possible to resume the suspended updating process by reference to the log data stored in the journaling area 116.

The present invention is applicable to both a portable device having a single processor and that having two or more processors. It is a current trend to adopt a dual-chip structure having two processors in a mobile communication terminal. In the dual-chip structure, one processor chip functions as a modem for executing a communication protocol, while the other processor chip is used for various applications, such as a UI (User Interface) and a VOD (Video On Demand). The dual-chip structure can reduce overload, which may be caused when a single chip is used in a portable device. When the present invention is applied in a portable device having the dual-chip structure and using a flash memory, which is not subject to update, data stored in the second backup journaling area 120 can be kept even if an updating process is abnormally suspended with the second backup journaling area 120 erased.

Figure 5:
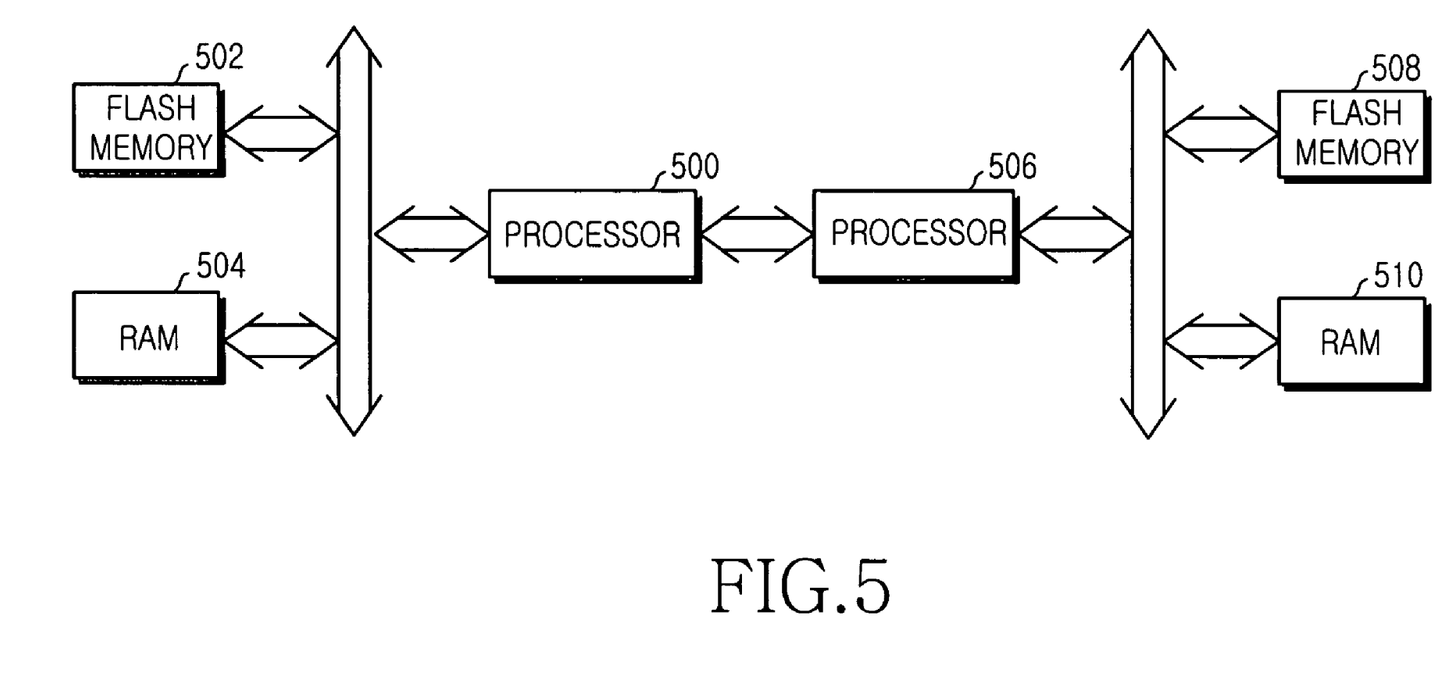
FIG. 5 illustrates a configuration of a software update system according to a second embodiment of the present invention.

FIG. 5 illustrates a configuration of a software update system according to a second embodiment of the present invention, which is applicable to a portable device having a dual-chip structure. The software update system has two processors 500 and 506. A flash memory 502 and a RAM 504 are provided for one processor 500, while a flash memory 508 and a RAM 510 are provided for the other processor 506. One of the two processors 500 and 506 functions as a modem, and the other is used for various applications.

In the following description, it is assumed that the flash memory 502 and the processor 500 in FIG. 2 are subject to update, and that the flash memory 502 storing software for the operation of the processor 500 has a memory map as shown in FIG. 1 according to the present invention.

Figure 6:
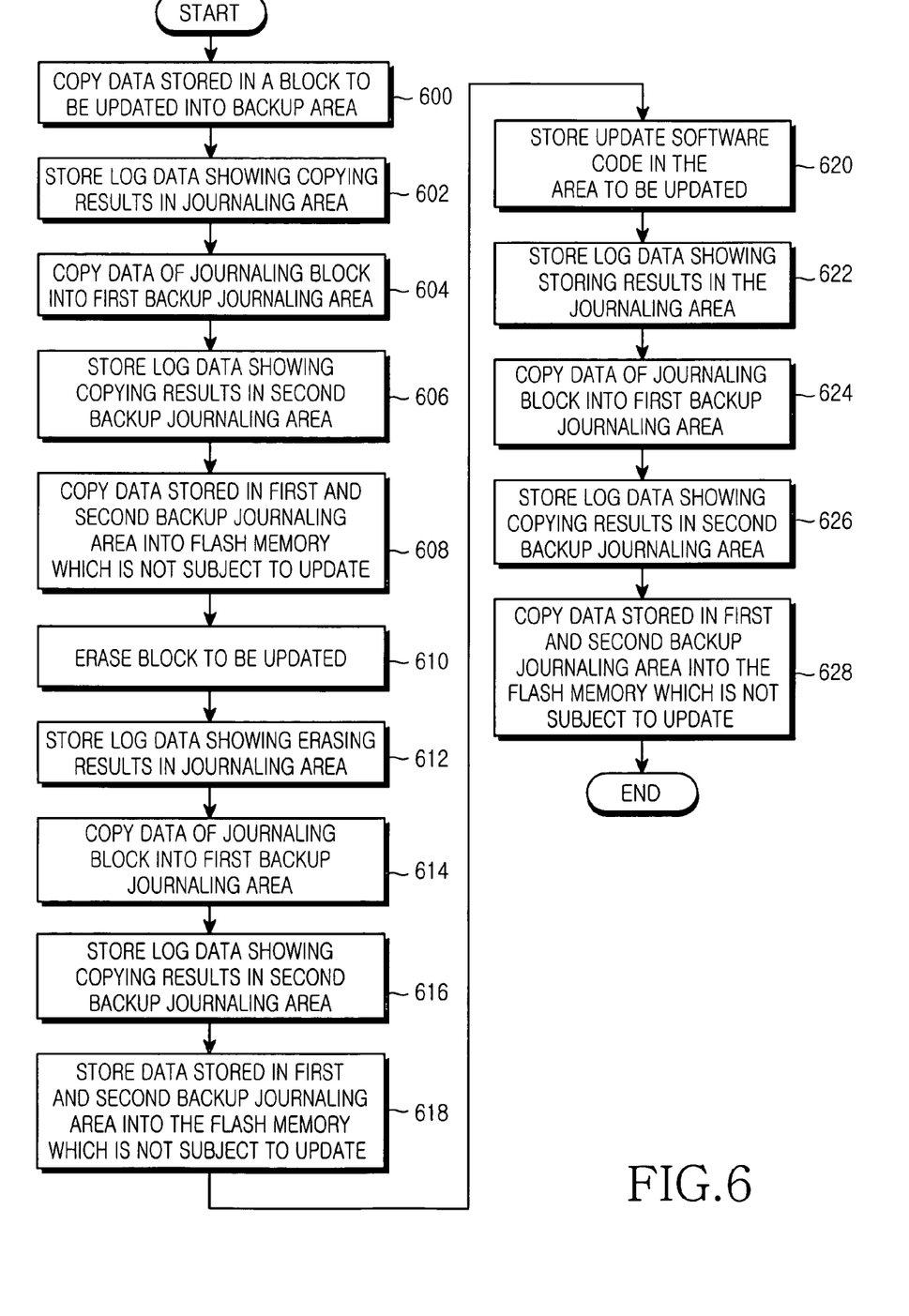
FIG. 6 is a flow chart illustrating an updating process according to the second embodiment of the present invention.

FIG. 6 is a flow chart illustrating an updating process comprising steps 600 to 628 according to the second embodiment of the present invention. The processor 500 performs steps 600 to 628 when the flash memory 502 in FIG. 5 is a NAND-type flash memory having a memory map as illustrated in FIG. 1. An update agent program for performing the updating process is stored in the update agent program area 110 in FIG. 1. Steps 600-606, 610-616, and 620-626 in FIG. 6 are the same as steps 300-306, 308-314, and 316-322, respectively. Therefore, a description of these steps will not be made again. However, at steps 608, 618, and 628, the processor 500 copies the data stored in first and second backup journaling areas 118 and 120 into the flash memory 508, which is not subject to update, in order to prepare for the possibility that the updating process is suspended by an abnormal power loss after erasure of the second backup journaling area 120. Whenever each step of copy (step 600), erase (step 610), and store (step 620) is completed, log data indicating the results of implementation of each step is stored in the journaling area 116. The data stored in the journaling area 116 is copied into the first backup journaling area 118, and log data indicating the copying results is stored in the second backup journaling area 120. Also, all the data stored in the first and second backup journaling areas 118 and 120 are copied into the flash memory 508, which is not subject to update. More specifically, the processor 500 transfers the data stored in the first and second backup journaling areas 118 and 120 to the processor 506 to copy the data into the flash memory 508. In a portable device having the dual-chip structure as illustrated in FIG. 5, the data copy can be implemented through a communication between the two processors 500 and 506.

Figure 7:
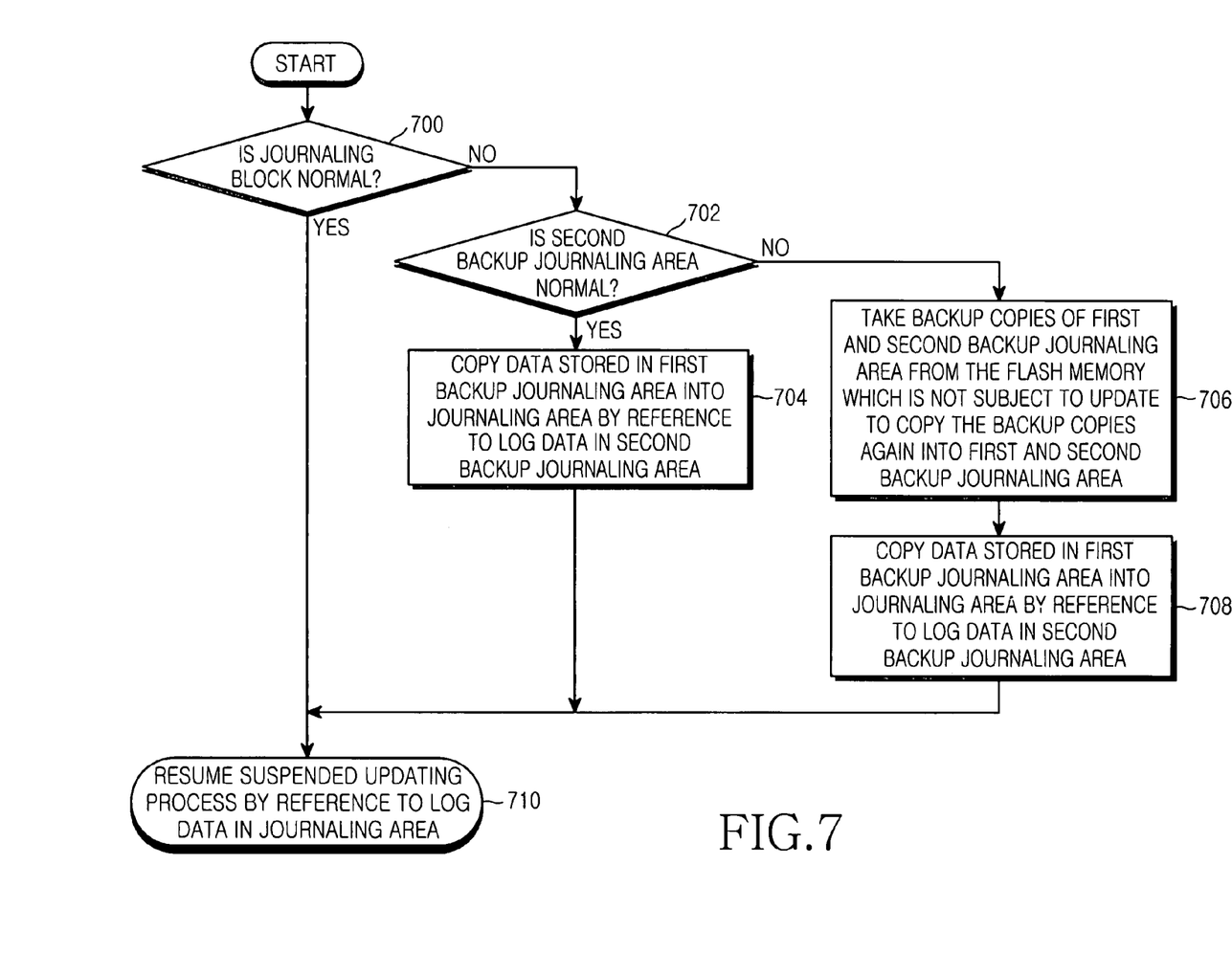
FIG. 7 is a flow chart illustrating a process of resuming a suspended updating process according to the second embodiment of the present invention.

FIG. 7 is a flow chart illustrating a process of resuming an updating process that has been suspended by a sudden power loss according to the second embodiment of the present invention. When the portable device reboots, the processor 500 performs steps 700 to 710 to resume the updating process according to the update agent program stored in the update agent program area 110 in FIG. 1. When booting, the processor 500 confirms whether an updating process has been suspended before. If so, the processor 500 confirms whether the journaling area 116 is normal according to the update agent program at step 700. If the journaling area 116 is normal, the processor 500 will proceed with step 710, which is the same as step 404 in FIG. 4.

At step 710, the processor 500 resumes the updating process by reference to the log data stored in the journaling area 116. However, if the journaling area 116 is determined to be abnormal at step 700, the processor 500 will confirm whether the second backup journaling area 120 is normal at step 702. If the second backup journaling area 120 is normal, the processor 500 will proceed with step 704, which is the same as step 402 in FIG. 4, to copy the data stored in the first backup journaling area 118 into the journaling area 116 by reference to the log data stored in the second backup journaling area 120, and will proceed with next step 710. However, if the second backup journaling area 120 is abnormal (that is, if the second backup journaling area 120 has been erased), the backup copies of the first and second backup journaling areas 118 and 120, which have been stored in the flash memory 508 of the processor 506, will be copied again into the first and second backup journaling areas 118 and 120.

As was done in step 704, the processor 500 copies the data stored in the first backup journaling area 118 into the journaling area 116 at step 707 by reference to the log data stored in the second backup journaling area 120, and then proceeds with step 710. If the updating process is suspended by a sudden power loss after erasure of the second backup journaling area 120 and the journaling area 116 is abnormal, the processor 500 can resume the updating process by reference to the log data copied into the flash memory 508, which is not subject to update.

As described above, if Journaling is applied to update software stored in a flash memory, the present invention can resume a suspended updating process even when the log data stored in the journaling area is lost.

While the present invention has been shown and described with reference to certain preferred embodiments thereof, it will be understood by those skilled in the art that various changes in form and details may be made therein without departing from the spirit and scope of the invention as defined by the appended claims. Although only embodiments applied in a NAND flash memory have been described, the present invention can also be used in a NOR flash memory. The present invention is applicable to any embedded system that stores software of a processor in a flash memory, as well as a portable device. Therefore, this invention is not to be unduly limited to the embodiments set forth herein, but to be defined by the appended claims and equivalents thereof.

What is claimed is:

1. A method for updating software stored in a flash memory of a single independent portable device by using an updating process with plural steps, the method comprising the steps of:

updating the software while storing log data indicating results of implementation of each step of the updating process in a journaling area allocated in the flash memory of the portable device;

whenever each step of the updating process is completed, copying the log data stored in the journaling area into a first backup journaling area allocated in the flash memory of the portable device and storing log data indicating copying results in a second backup journaling area allocated in the flash memory of the portable device, wherein said flash memory is a NAND-type flash memory;

determining whether the journaling area is normal when it is confirmed during booting that the updating process has been suspended;

resuming the suspended updating process by referring to the log data stored in the journaling area when the journaling area is determined to be normal;

copying the data stored in the first backup journaling area into the journaling area by referring to the log data stored in the second backup journaling area when the journaling area is determined to be abnormal; and resuming the suspended updating process by referring to the log data copied into the journaling area.

2. A method for updating software by using an updating process with plural steps in a single independent portable device including at least two processors and at least two flash memories for storing software of the respective processors, said method comprising the steps of:

updating the software while storing log data indicating results of implementation of each step of the updating process in a journaling area allocated in one of the at least two flash memories of the portable device, which is subject to update;

whenever each step of the updating process is completed, copying data stored in the journaling area into a first backup journaling area allocated in one of the at least two flash memories and storing log data indicating copying results in a second backup journaling area allocated in one of the at least two flash memories of the portable device;

copying the data stored in the first and second backup journaling areas into one of the at least two flash memories of the portable device, which is not subject to update, wherein said flash memory, which is subject to update, is a NAND-type flash memory;

determining whether the journaling area is normal when it is determined during booting that the updating process has been suspended;

resuming the suspended updating process by referring to the log data stored in the journaling area when the journaling area is determined to be normal;

determining whether the second backup journaling area is normal when the journaling area is determined to be abnormal;

copying the data stored in the first backup journaling area into the journaling area by referring to the log data stored in the second backup journaling area when the second backup journaling area is determined to be normal;

taking backup copies of the first and second backup journaling areas from the other of the at least two flash memories, which is not subject to update, to recopy the backup copies into the first and second backup journaling areas, and copying the data stored in the first backup journaling area into the journaling area by referring to the log data in the second backup journaling area, when the second backup journaling area is determined to be abnormal; and resuming the suspended updating process by reference to the log data copied into the journaling area.

3. A software update system in a single independent portable device comprising:

a flash memory in the portable device for storing software and allocating a journaling area, a first backup journaling area, and a second backup journaling area therein; and a processor in the portable device for updating the software using a software updating process with plural steps while storing log data indicating results of implementation of each step of the software updating process in the journaling area, copying the log data stored in the journaling area into the first backup journaling area whenever each step of the software updating process is completed, and storing log data indicating copying results in the second backup journaling area, wherein said flash memory is a NAND-type flash memory, and wherein said processor copies the data stored in the first backup journaling area into the journaling area by referring to the log data in the second backup journaling area, when the journaling area is determined to be abnormal, and resumes the suspended updating process by referring to the log data copied into the journaling area.

4. A software update system in a single independent portable device using a software updating process with plural steps, the system comprising:

at least two processors in the portable device for communicating with each other; and at least two flash memories in the portable device for storing software of the respective processors, wherein a first of the at least two flash memories, which is subject to update, allocates a journaling area, a first backup journaling area, and a second backup journaling area therein, wherein a first processor of the at least two processors associated with the first flash memory, which is subject to update, stores log data indicating results of implementation of each step of the software updating process in the journaling area to update the software, copies the log data stored in the journaling area into the first backup journaling area, and stores log data indicating copying results in the second backup journaling area whenever each step of the software updating process is completed, and copies the data stored in the first and second backup journaling areas into a second flash memory of the at least two flash memories, which is not subject to update, and wherein said flash memory, which is subject to update, is a NAND-type flash memory, and wherein said first processor, which is subject to update, takes backup copies of the first and second backup journaling areas from the second flash memory, which is not subject to update, to recopy the backup copies into the first and second backup journaling areas, when it is determined during booting that the updating process has been suspended and that the journaling area and the second backup journaling area are abnormal; copies the data stored in the first backup journaling area into the journaling area by referring to the log data copied into the second backup journaling area; and resumes the suspended updating process by reference to the log data copied into the journaling area.

* * * * *

UNITED STATES PATENT AND TRADEMARK OFFICE
CERTIFICATE OF CORRECTION

PATENT NO. : 7,664,923 B2 Page 1 of 1
APPLICATION NO. : 10/819555
DATED : February 16, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 843 days.

Signed and Sealed this

Seventh Day of December, 2010

David J. Kappos
*Director of the United States Patent and Trademark Office*